United States Patent [19]
Acerno et al.

[11] Patent Number: 5,183,279
[45] Date of Patent: Feb. 2, 1993

[54] SULKY

[76] Inventors: Michael J. Acerno, 262 Highway 33, Freehold, N.J. 07728; Mark A. Guarino, 30 Runyon Dr., Trenton, N.J. 08610

[21] Appl. No.: 682,628
[22] Filed: Apr. 9, 1991
[51] Int. Cl.⁵ .............................................. B62C 1/08
[52] U.S. Cl. .................................................. 280/63
[58] Field of Search ............... 280/63, 64, 65, 446.1, 280/460.1, 488, 489, 47.25; 54/2, 39

[56] References Cited

U.S. PATENT DOCUMENTS

| | | | |
|---|---|---|---|
| 571,003 | 11/1896 | Keeler | 280/64 |
| 3,256,125 | 6/1966 | Tyler | 280/63 X |
| 3,482,851 | 12/1969 | Pickard | 280/63 |
| 3,628,806 | 12/1971 | Weber | 280/63 |
| 3,907,325 | 9/1975 | Gaines et al. | 280/63 X |
| 3,944,243 | 3/1976 | Yates | 280/63 |
| 4,071,257 | 1/1978 | Discount | 280/63 |
| 4,078,829 | 3/1978 | Davis | 280/657 |
| 4,095,815 | 6/1978 | Mitchell | 280/63 |
| 4,326,367 | 4/1982 | Cashman | 54/2 |
| 4,421,339 | 12/1983 | Hagin | 280/460.1 |
| 4,480,428 | 11/1984 | Gilbertson | 54/69 |
| 4,679,807 | 7/1987 | Raybon | 280/65 |
| 4,863,180 | 9/1989 | Guarino | 280/63 |

Primary Examiner—Margaret A. Focarino
Assistant Examiner—Michael Mar
Attorney, Agent, or Firm—Harvey L. Cohen

[57] ABSTRACT

A sulky for carrying a rider behind a horse consisting essentially of an arch, a pair of wheels connected to the arch, a pair of rails extending from the arch forward in the direction of the horse, one on each side thus establishing a plane and the direction of the rails establishing a longitudinal axis of the sulky, a coupling for coupling each of the rails to the arch, wherein the coupling permits lateral movement of the rails about vertical pivot axes relative to the arch and an element for stabilizing movement of the rails connected between the plane of the rails substantially adjacent the horse and the arch. In a preferred embodiment the motion of the rails is restricted to lateral movement in a horizontal plane and the ends of the rails adjacent the arch are movably connected with a "U" joint overlapping the upper and lower surfaces of the arch. In a particularly preferred embodiment, the segments of the rails adjacent the harness of the horse include a ball joint-containing section and a free end which is capable of quickly coupling to a clevis integral with the harness.

10 Claims, 2 Drawing Sheets

SULKY

BACKGROUND OF THE INVENTION

This invention relates to a racing sulky generally intended for horse racing such as trotters and pacers. More specifically it relates to a racing sulky or race bike which incorporates a shaft movably coupled to the race bike arch for improved racing performance of the horse and improved control by the driver of the race bike. It additionally relates to a race bike which is movably coupled to the harness of the horse at the end of the rails opposite the arch to provide a race bike capable of tracking independently of the horse to which it is joined. As a result of unique construction features, the race bike is also safer in the event of an accident, e.g., where the horse falls.

In a horse racing environment at least two distinctly different conditions exist. The first represents straight-line motion which places few stresses on the race bike that are out of conformity with those on the horse. However, racing around the curve of a race track or moving around other horses causes the ordinary race bike of the prior art and those in common use today, to slide sideways as the forces on the bike tend to cause the bike to remain lined up directly behind the horse. Such sideways sliding results in a loss of energy generated by the horse and instability which must be controlled by the driver. The energy loss causes a slower passage by the horse/bike combination in the course of the race. Furthermore, the present invention embodies simplified features of construction and a unique placement and combination of elements which result in advantageous features.

U.S. Pat. No. 4,863,180 (by the same inventors as herein) discloses a racing sulky with rails movably coupled to the arch and stabilizing elements mounted outboard of the rails; that is, on the side of each rail closest to the wheels. Furthermore, it is disclosed that the rails are adapted to be harnessed to the flanks of a horse using a conventional harness (which was not shown). The disclosure of U.S. Pat. No. 4,863,180 is incorporated herein by reference and comprises only a starting point for the further improvements described herein.

U.S. Pat. No. 4,480,428 consists of a coupling device for quickly and easily coupling the shafts or rails of a sulky to the harness of a horse. In at least one aspect of the present invention, advantageous features of the coupling device are combined with similarly advantageous features of the present invention in order to make further advances. The disclosure of U.S. Pat. No. 4,480,428 is incorporated herein by reference.

U.S. Pat. No. 4,326,367 incorporates ball joints at the point of connection between the shafts of the sulky frame to the harness of the horse in order to reduce twisting forces when the horse moves relative to the sulky. It is disclosed that the ball joints avoid unnecessary restraint upon the running horse by allowing only pulling forces, as opposed to twisting forces, to be applied through the shafts of the sulky.

U.S. Pat. No. 4,078,829 discloses a metal racing sulky in which the various elements comprising the sulky are adjustable to accommodate variations in the size of horse and driver. The elements are locked in position after adjustment in order to provide for a rigid structure. Adjustment of the fork includes a telescoping joint at 39 and 42 which is rigidly fastened after selection of the preferred position.

U.S. Pat. No. 4,071,257 discloses a shock-absorbing frictionally loaded lost-motion coupling which allows limited relative movement between the rails and the forks of the sulky to reduce shock load transfer back and forth between the horse and sulky.

U.S. Pat. No. 571,003 discloses a sulky wherein the seat is joined by a mechanical linkage to the wheels so that the seat is tilted and the wheels are canted as the sulky is drawn in a curved path at high speeds.

SUMMARY OF THE INVENTION

A sulky for carrying a rider behind a horse consisting essentially of an arch, a pair of wheels connected to said arch, a pair of rails extending along the longitudinal axis of said sulky, coupling means for coupling said rails to said arch, said coupling means including means for permitting lateral movement of said rails about vertical pivot axes relative to said arch, fork means connected between said rails and said arch and movement-stabilizing means connected between the plane of said rails substantially adjacent said horse and said arch.

DETAILED DESCRIPTION OF THE PREFERRED EMBODIMENTS

Figure 1:
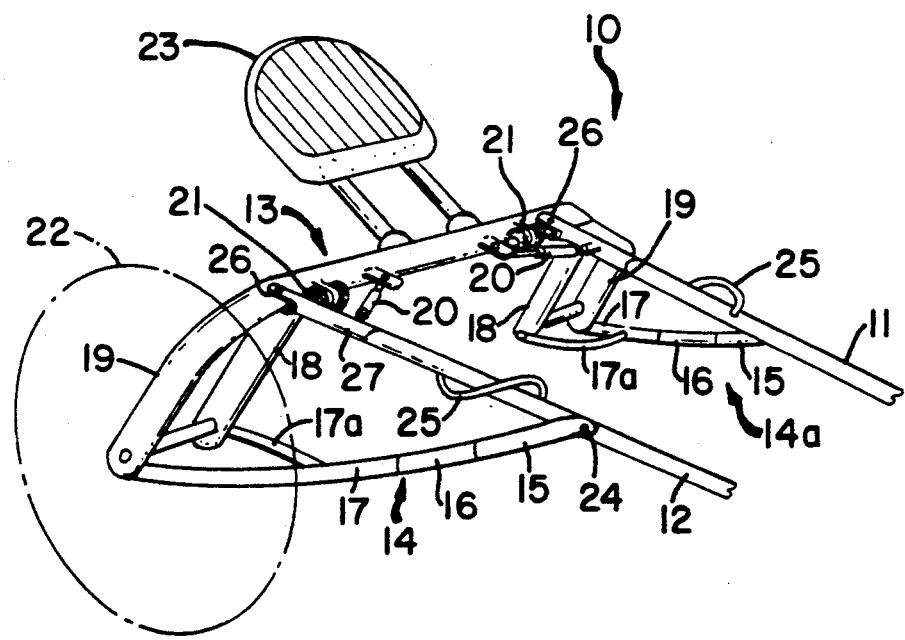
FIG. 1 is a view in perspective of a sulky or race bike embodying the present invention.

Referring to FIG. 1, the invention is illustrated as embodied in a sulky 10 having a pair of substantially horizontal rails and 12 adapted to be harnessed to the flanks of a horse using a conventional harness (not shown). However, in an alternate, preferred embodiment there are rail (or shaft) connecting (or coupling) means provided on the harness to engage the ends of the rails closest to the harness in a quick and easy manner. Such means comprising the harness portion are disclosed in U.S. Pat. No. 4,480,428, incorporated herein by reference. The most critical element of the harness portion is the clevis which is adapted to accept the coupling element on the rail portion; this coupling element is described in detail hereinafter. The rails are movably coupled to an arch 13, the two depending ends on each side, 18 and 19, of which are adapted to be conventionally connected to wheels 22 respectively. The arch is preferably hollow and constructed of a material such as aluminum to conserve weight. A drivers seat 23 is cantilevered rearward from the central portion of the arch 13 and is typically adjustable fore and aft to suit the physical characteristics and driving preferences of the driver. Footrests, 25, are provided on the rails.

Figure 2:
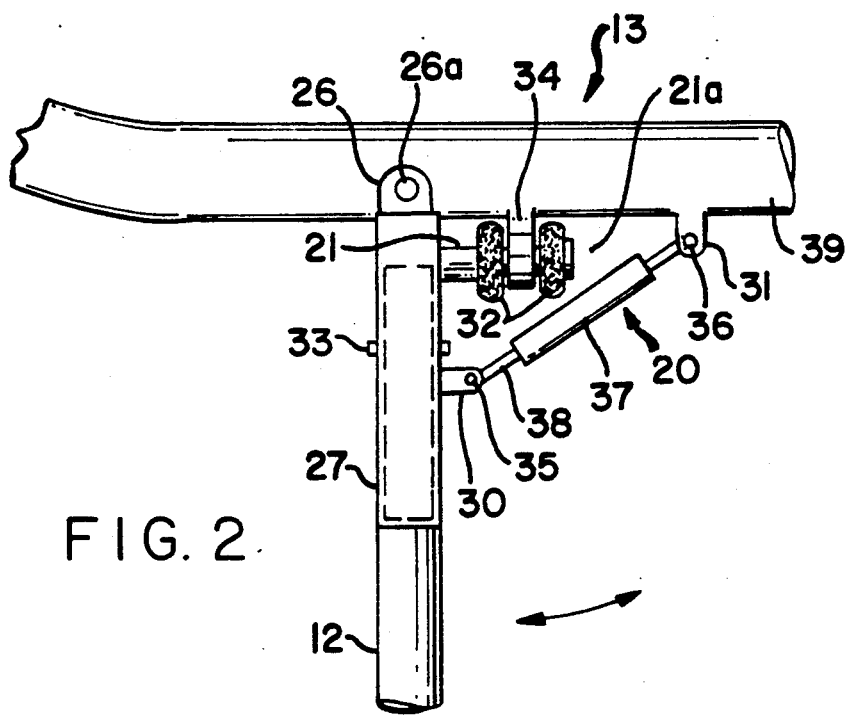
FIG. 2 is a top, fragmentary view showing the rail-to-arch junction.

The rails 11 and 12 are movably coupled to the arch by means of a generally "U" shaped joint or flange which is spaced apart from and overlies the arch at its upper and lower surfaces. Such a "U" shaped joint, used in a somewhat different manner, is shown in detail in the inventors U.S. Pat. No. 4,863,180, incorporated herein by reference. In particular, reference is made to FIG. 4 in which the "U" shaped joint appears as end piece 53. As described in the patent, the end piece and "U" joint can be a separate element adapted to fit with the rail at the end of the rail closest to the arch (e.g., using an extension 65, at the end of the "U" joint closest to the rail, of reduced cross-sectional dimension so as to fit with the rail and joined to it by means of a threaded connector such as a threaded bolt). Alternatively, the end piece and "U" joint can be the integral rear portion of the rail instead of a separate element. Referring to FIG. 2 of the present invention, the "U" joint is shown coupled to the arch by means of pin 26a which passes through the "U" joint 26 and arch 13 in a vertical axis permitting lateral motion as shown by the double ended arrow in the figure. The rail 12 and the rail-to-arch connector 27 are illustrated as separate elements. In this manner the various elements described hereinafter can be independently constructed as an integral part of the connector which is typically metal, whereas the rail is most often and preferably made of wood. The two elements are conveniently joined, for example, by use of bolts 33.

Also included in the embodiment illustrated in FIG. 1 is the fork assembly, one for each rail/wheel combination, indicated generally by 14 and 14a. The fork assembly typically serves a dual purpose; it couples the rails, arch and wheels, and it protects one sulky from contacting or locking with the wheels of another. However, an alternate embodiment of the invention includes the rails and arch but excludes a fork assembly for each side of the sulky. Such a sulky may be inappropriate for a race environment with other horses and sulkies in close proximity, but it can be used, for example during training or practice sessions. Additionally, replacement of the fork assembly with alternative means to provide for the protective function of the fork still permits the movably coupled rails to be utilized.

A critical element of the invention is the movement-stabilizing means, 20. In FIG. 1 stabilizing means is provided for each rail, 11 and 12. In the embodiment illustrated in Figure the stabilizing means couples each rail to the horizontal, front-facing plane of the arch. A particular improvement of the present invention is the positioning of the stabilizing means on the plane of the rail substantially adjacent the horse (i.e., the "inner" surface) and the (front facing) plane of the arch. In this way, the neutral position of the rails is maintained substantially perpendicular to the arch in a horizontal plane. The stabilizing means is coupled at its ends to a tab or collar of the rail 30 and arch 31 by means of a pin or bolt. The stabilizing means serves to damp excessive motions of the rails which are, as noted above, movably coupled to the arch. Suitable stabilizing means include damping means, preferably shock absorbing means, for example a gas filled shock absorber.

The forks 14 and 14a, are each comprised of a flanking strut which is comprised of elements 15, 16 and 17 which are present on each one, and struts 17a on each connecting the flanking struts 17 with the depending element of the arch. Elements 17 are each connected to the end of the other depending element on each side of the arch. The forks are connected at their rail ends by couplings which can take the form, for example, of a weld which would fix its position) or a bolt and, e.g., rubber, bushing (which would permit limited flexibility); preferably the connections at the depending elements of the arch are in the form of welds whereas the connection at the rail, 24, is in the form of a bolt.

Since the rails are movably coupled to the arch in a manner which permits, for example, motion in a generally horizontal plane, a sulky which includes a fork assembly, must necessarily accommodate motion in the fork assembly even though it is fixed at its ends as noted above. Such motion is accomplished in the embodiment illustrated in FIG. 1 at element 16 of the flanking strut; details of means which achieve such motion are illustrated more particularly in FIG. 3.

Coupling of the stabilizing means to the rails and the arch is shown in further detail in FIG. 2; only one such arrangement is illustrated since each side of the sulky is a mirror image of the other. The elements of FIG. 2 are seen in a top view which clearly shows stabilizing means 20, in this embodiment exemplified by a shock absorber, connected to the rail by means of a pin 35 passing through connecting tab 30; if desired two such tabs can be employed, spaced apart vertically as alternatively illustrated in FIG. 7 of U.S. Pat. No. 4,863,180. The shock absorber, comprising piston and cylinder elements 37 and 38 is coupled at its other end to the horizontal surface of the arch 39. In FIG. 2, such coupling is achieved by means of a tab or collar 31 and pin 36, of similar structure to the rail end coupling. Alternatively, an adjustable moveable block can be employed as shown in FIG. 2 of U.S. Pat. No. 4,863,180 as follows: Adjustability by means of moveable block 44 allows for fine tuning of the sulky to suit each driver/horse combination. Turning the screw element 45, which passes through the moveable block, clockwise or counterclockwise causes the block to move in a substantially horizontal plane closer to or further away from the wheel 26. The moveable block is stabilized by rod 47 which is fixed at its ends to tabs 46 and 48 which are fixed to the arch; rod 47 passing through an opening in the moveable block. Details of this structure are further illustrated in FIG. 7. As noted hereinabove, the fixed coupling is simpler to operate and maintain.

Stabilization of the rail against rotating motion is achieved in the present invention in a much superior manner by the "U" shaped joint which overlaps and is pinned to the rail. The legs of the "U" overlap and are spaced apart from the upper and lower surfaces of the rail. Load bearing washers which permit movement in the spaced-apart area can be conveniently included; pin 26a links the "U" joint 26 to the arch 13. Alternatively, the end of the rail to be coupled to the arch is reduced in cross-sectional dimension and inserted into a slot opening in the arch sufficiently wide to permit lateral movement of the rail and coupled to the arch with a pin.

In order to further limit the motion of the rail 12, there is included as preferred element a motion limiting extension rod 21 connected to the rail at its end adjacent the arch and passing through an extension from the arch 34. Including flexible bushings 32 (e.g., rubber) on each side of the arch extension permits the rail to move horizontally consistent with the compression characteristics of the bushings. By means of this overall construction, movement is facilitated and controlled.

Figure 3:
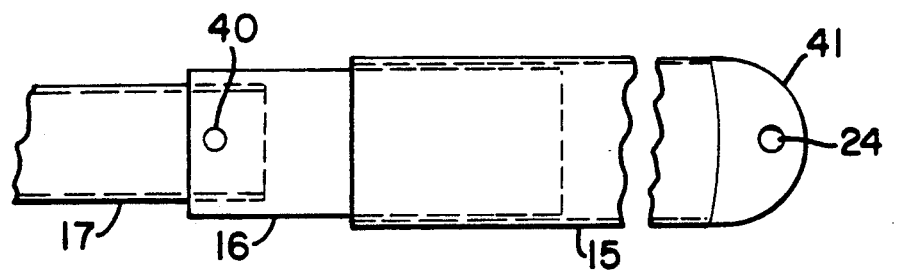
FIG. 3 is a detailed view of the telescoping branch of the fork.

As noted above, means for achieving motion within the fork assembly is illustrated in FIG. 3. The flanking strut of the fork assembly comprises two sections, 15 and 17 which can move relative to one another. In the preferred embodiment the extension 16 of element 17 fits within 15 and is constructed of a material such as Teflon ® which is joined to 17 by, e.g., bonding or by means of a screw or pin 40, and which permits sliding or telescoping motion of 15 relative to 17. Alternatively 16 can be constructed of the same material as 17 and can be lubricated on its outer surface so as to telescopically slide within element 15. In another alternative embodiment, element 15 is constructed of a material which slides on its inner surface against the outer surface of 16, with or without a lubricant to facilitate such motion. Utilizing a flexible but strong material such as high density polyethylene or another engineering plastic allows for additional flexibility in the telescoping motion of 15. As noted previously, element 15 is coupled to the rail 12 at its other end by means of a removable connector such as a bolt or pin at 24.

An alternative means of achieving motion of the fork assembly is accomplished by utilizing a piston-cylinder construction as part of the flanking strut assembly 17 and 15. Such an element is embodied, e.g., in a shock absorber and therefore it is also capable of contributing to the stability of the overall unit by dampening excessive motion of the rail to which it is joined.

Still another means of achieving motion with the fork assembly is accomplished by allowing the rearward ends of each fork, 17 and 17a, to pass through openings in the corresponding depending arms of the arch, 18 and 19. Motion of the forks is facilitated by including a lubricated sleeve or Teflon ® sleeve in the openings of the depending arms through which the fork component passes. In such an arrangement structural integrity is improved by locating the openings in the depending arms at approximately the same position in each arm.

It is to be understood that, for the purposes of the present invention, movably coupling the rail to the arch refers to the ability of the rail to undergo significant, controlled movement especially in comparison to the rigid, e.g., welded construction of the prior art. Movement of the rails of the present invention is essentially limited to lateral movement as compared to the wider range of motion disclosed in U.S. Pat. No. 4,863,180; e.g., substantial axial movement and rotation are precluded as a result of the "U" joint being coupled to the arch by means of a pin or bolt. However, the lateral movement of the present invention has been observed to result in an improved sulky and the stabilizing element, e.g., shock absorber, still remains a critically required feature for a racing sulky. Undesirable movement of the rail would be particularly apparent in the absence of stabilizing means 20. The present invention represents a lesser range of motion than disclosed in U.S. Pat. No. 4,863,180, but substantial compared to prior art rigid structures.

The improved sulky of the present invention continues to have advantages with regard to safety as did its predecessors in U.S. Pat. No. 4,863,180. The sulky has improved control since it is not subject to sliding out around a turn as a result of its unique, accurate tracking characteristics as described earlier. Furthermore, in the event of a spill or fall by the horse, the fork can separate and maximum stress on the rail will occur at a point rearward of the fork to rail juncture. In the absence of forks in the construction, as described hereinabove, the maximum stress will also occur in this rearward location. Resulting failure or fracture of the rails at this rearward location can result in the driver being spilled from the seat, but it is less likely to cause the rails to be driven into the track, (as would occur if the rails fractured at a more forward position) resulting in a catapulting of the driver and accompanying severe injury to the driver.

As noted previously, the present invention is useful and results in a desirable structure when the rails are coupled to the harness of the horse in a standard manner, such as described in U.S. Pat. No. 4,480,428 at column lines 9-20. However, a particularly preferred embodiment of the present invention is accomplished when it is especially adapted to be used in combination with the quick shaft hitch-up and release mechanism disclosed in U.S. Pat. No. 4,480,428 (hereinafter referred to as '428 and as noted previously, incorporated herein by reference); a commercial embodiment of the shaft coupler 3 disclosed in the '428 patent is known as the Rondeau Quick Hitch ®.

Figure 4:
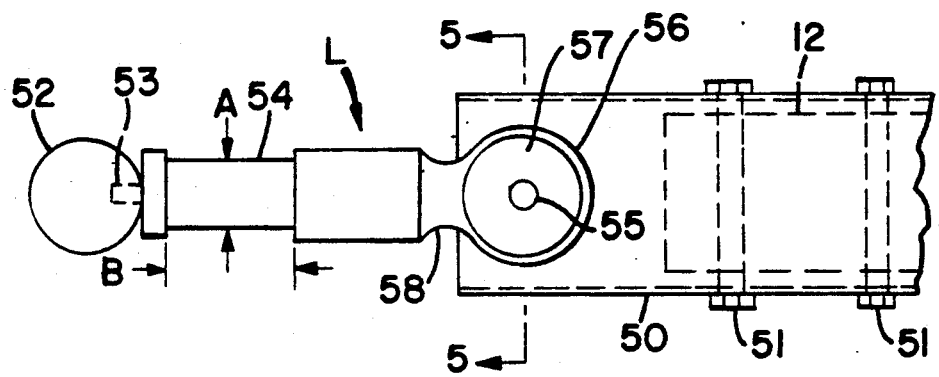
FIG. 4 is a detailed view of an embodiment showing a ball joint coupling mechanism for the rail to the harness of the horse.
Figure 5:
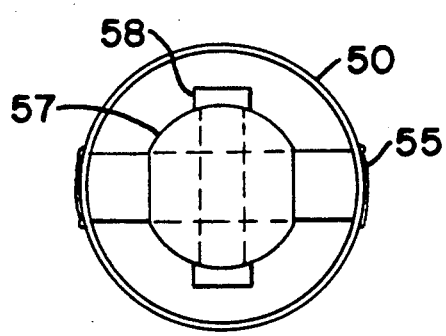
FIG. 5 is a cross-sectional view taken on the line 5—5 of FIG. 4.

In order to achieve this particularly useful and preferred combination, the end of each rail to be coupled to the '428 shaft coupler is modified as illustrated in FIG. 4 and 5. In this manner each rail quickly can be coupled to the harness by engaging the element disclosed in the '428 patent as the "clevis" and identified in FIGS. 2 and 3 therein by the numeral 6. The '428 patent discloses coupling of the rails (shafts) in the following manner:

"Each of the shafts 18, terminates at its free end into a centrally located, narrowed down end 19 which fits freely into the clevis 6. A hole 20 is provided in this narrowed down end 19 through which passes the pin 12 when the shaft 18 is fixed to the harness." (col. 2, lines 12-16).

The means by which the inventors herein achieve the coupling of rail (shaft) to harness is illustrated in FIG. 4. The end of the rail 12 is joined to an end piece 50 by means of bolts or pins shown at 51. The end piece 50 is preferably a hollow structure that extends from the rail and incorporates the necessary features to permit it to be advantageously used with the quick release shaft coupler of the '428 patent. Essential to the coupling ability is the movable link L. It is joined to the rail extension 50 by means of a ball joint comprising an outer ring 56 and an inner ball ball 57, the latter ball being fixed to the extension 50 by means of a pin 55. The outer ring 56 is joined to the linking portion 54 of the movable link by, e.g., a welded portion 58. The linking portion 54 is defined by the dimensions A and B which are achieved, for example, by machining 54 from cylindrical stock. The dimensions A and B are appropriate to fit within the clevis of the shaft coupler described above with reference to the '428 patent. The element 52 is a convenient hand-hold which is joined to the linking portion by means of a threaded end piece 53, on the linking portion.

What distinguishes the present invention and provides for unique features hitherto unknown and unavailable in the sulky art is the "freely" movable nature of the rail-to-harness coupling. While taking advantage of the quick coupling and release features of the '428 mechanism it permits the linking element to move by means of the ball joint until it makes contact with the inner surface of the rail extension 50. Such movement can be used advantageously in combination with the movable rail-to-arch coupling disclosed hereinabove since a controllable structure is provided, particularly with the incorporation of the stabilizing means, e.g., the shock absorber. The use of the movable linking element, e.g., the ball joint coupled linking element, in combination with a prior art, rigidly coupled rail-to-arch structure, results in an unstable sulky structure. In contrast, the movable link, quick coupling and release rail to harness mechanism is a further improved and particular preferred embodiment of the movable rail-to-arch coupling disclosed herein. The combined elements provide an improved sulky, in particular an improved racing sulky.

While the invention has been described above having reference to the embodiments and variations therein, illustrating its versatility, it will be understood that it can take other forms and arrangements within the scope, function and spirit of the invention as defined by the following claims:

We claim:

1. A sulky for carrying a rider behind a horse consisting essentially of an arch, a pair of wheels connected to said arch, a pair of rails extending from said arch forward in the direction of said horse, one on each side thus establishing a plane, and said direction of said rails establishing a longitudinal axis of said sulky, coupling means for coupling said rails at their rearmost ends to said arch, said coupling means including means for permitting lateral movement of said rails about vertical pivot axes relative to said arch, fork means connected between said rails and said arch and movement-stabilizing means for connecting each of said rails to said arch and lying substantially in said plane between said rails and between said arch and said horse, each movement stabilizing means including a shock absorber connected between each rail and said arch and flexible coupling means connected between the rearmost end of each rail and said arch for permitting limited lateral movement of said rails about said vertical pivot axes while preventing rotational movement of said rails relative to said arch.

2. A sulky as set forth in claim I wherein said coupling means comprise "U" shaped joints overlapping said arch about the upper and lower surfaces of said arch and movably fixed thereto in said vertical pivot axis.

3. A sulky as set forth in claim 1 wherein said coupling means comprise rail ends adjacent said arch wherein said ends are of reduced cross sectional dimension adapted to fit within an opening in said arch, said openings wider than the width of said rail ends wherein said rail ends are movably coupled to said arch.

4. A sulky as set forth in claim 1 wherein said fork means comprise means for axial movement in the branch of said fork coupled at one of its ends to said rail and coupled at its other end to said arch.

5. A sulky as set forth in claim 4, said axial movement means comprising telescoping means.

6. A sulky as set forth in claim 5, said axial movement means comprising a low friction member mounted axially on and integral with said branch to facilitate telescoping motion.

7. A sulky as set forth in claim 4, said axial movement means comprising a piston element.

8. A sulky as set forth in claim 1 wherein said rails are coupled to said horse by means which permit motion of said coupled rails adjacent said horse in vertical and lateral directions and combinations thereof, relative to said longitudinal axis.

9. A sulky as set forth in claim 8 wherein said motion means comprise a ball joint integral with said rail, wherein the free end of said rail is removably coupled to a harness on said horse.

10. A sulky as set forth in claim 9, wherein said removably coupled free end is adapted to fit within clevis-containing coupling means of said harness.

* * * * *